United States Patent
Wang

(10) Patent No.: US 7,426,002 B2
(45) Date of Patent: Sep. 16, 2008

(54) LIQUID CRYSTAL DISPLAY HAVING ACTIVE AND PASSIVE MATRIX MODES

(75) Inventor: Chaung-Chi Wang, Miaoli Hsien (TW)

(73) Assignee: TPO Displays Corp., Chu-nan (TW)

( * ) Notice: Subject to any disclaimer, the term of this patent is extended or adjusted under 35 U.S.C. 154(b) by 442 days.

(21) Appl. No.: 11/081,523

(22) Filed: Mar. 17, 2005

(65) Prior Publication Data
US 2005/0213024 A1    Sep. 29, 2005

(30) Foreign Application Priority Data
Mar. 19, 2004    (TW) .............................. 93107514 A

(51) Int. Cl.
*G02F 1/1347* (2006.01)
(52) U.S. Cl. .......................................... 349/74; 349/77
(58) Field of Classification Search .................... 349/34, 349/38, 39, 77, 111
See application file for complete search history.

(56) References Cited

U.S. PATENT DOCUMENTS

| | | | |
|---|---|---|---|
| 5,986,729 A | * | 11/1999 | Yamanaka et al. ............ 349/79 |
| 6,783,874 B2 | | 8/2004 | Hasegawa et al. |
| 6,853,421 B2 | | 2/2005 | Sakamoto et al. |
| 2002/0130987 A1 | * | 9/2002 | Rajeswaran et al. ........... 349/73 |
| 2003/0071931 A1 | * | 4/2003 | Nakayoshi et al. ............ 349/39 |
| 2003/0234899 A1 | * | 12/2003 | Kawata ....................... 349/111 |
| 2004/0066155 A1 | * | 4/2004 | Faris .......................... 315/383 |
| 2004/0212300 A1 | * | 10/2004 | Chao et al. ................... 313/506 |
| 2005/0213024 A1 | | 9/2005 | Wang |

FOREIGN PATENT DOCUMENTS

WO    03044763    5/2003

* cited by examiner

*Primary Examiner*—David C. Nelms
*Assistant Examiner*—Nathanael R Briggs
(74) *Attorney, Agent, or Firm*—Liu & Liu

(57) ABSTRACT

A transmissive liquid crystal display having two driving matrix modes is disclosed. A first insulating layer, a first lower electrode, a second insulating layer, a second lower electrode and a first alignment film are formed subsequently on a lower substrate with a plurality of transistors fabricated thereon, whereas a first upper electrode, a third insulating layer, a second upper electrode and a second alignment film are formed subsequently on an upper substrate with color filters attached thereon. A liquid crystal layer is sandwiched between the first alignment film and the second alignment film. One of the first lower electrode and the second lower electrode is electrically connected to drain areas of transistors.

18 Claims, 4 Drawing Sheets

| matrix mode comparison | AMLCD | PMLCD |
|---|---|---|
| contrast ratio | higher | lower |
| resolution | more | less |
| electric consumption | more | less |
| manufacturability | complex | simple |

LIQUID CRYSTAL DISPLAY HAVING ACTIVE AND PASSIVE MATRIX MODES

FIELD OF THE INVENTION

The present invention relates to a transmissive type liquid crystal display (LCD). More particularly, the present invention relates to a transmissive type LCD having two operating matrix modes, active and passive, converged within a panel.

BACKGROUND OF THE INVENTION

Since the explosive growth in wireless communications is a worldwide phenomenon, the next generation of mobile phones, also known as 3G (third generation) or UMTS (Universal Mobile Telecommunication Services), is a technology that allows users to access e-mails, videos and webs via a mobile phone.

Many companies, such as Motorola and Samsung, have provided 3G mobile phones that possess two displays. These kinds of mobile phones offer people two viewing options. A large interior display is used for standard functions and an exterior one just shows a caller's ID or, time and date. According to this, the resolution of the interior display is much higher than the exterior one. The interior display with higher resolution is sometimes an active matrix liquid crystal display (AMLCD). The exterior display with less electrical consumption is a passive matrix LCD (PMLCD).

A liquid crystal (LC) layer of the PMLCD is sandwiched between an upper glass substrate and a lower glass substrate. A first set of electrical lines (electrodes) aligned in a row configuration and a second set of electrical lines aligned in a column configuration are located between the LC layer and the upper glass substrate, and the LC layer and the lower glass substrate, respectively, to form a matrix mode. In the matrix mode, each intersection of the electrical lines aligned in the row configuration and the electrical lines aligned in the column configuration is a pixel. When applying a voltage difference between the row and column electrical lines, alignments of the LC molecules change and the gray scale of the pixel is thus determined.

AMLCD is similar to the PMLCD. The major difference between the AMLCD and the PMLCD is that the AMLCD further comprises a switching device (e.g. thin film transistor; TFT) at its each pixel so as to provide faster switching rate and more image displays.

Referring to FIG. 1, a simple comparison between the AMLCD and PMLCD is shown. The electrical consumption of PMLCD is much less than that of AMLCD. The resolution and contrast ratio of AMLCD are higher those of AMLCD. In addition, the manufacturability of the AMLCD is much more complex than that of the PMLCD.

In order to include all the advantages that AMLCD and PMLCD have within a mobile phone but reduce the weight and the thickness of the mobile phone, it is required to integrate the active and the passive matrix modes within one LCD panel.

BRIEF SUMMARY OF THE INVENTION

Accordingly, an object of the present invention is to provide a transmissive type liquid crystal display with at least two matrix modes converged within a LCD panel.

Another object of the present invention is to provide a transmissive type liquid crystal display with at least two matrix modes converged within a panel, wherein at least one matrix mode comprises an active matrix mode.

A transmissive type liquid crystal display comprises a first substrate, a second substrate, a first insulating layer, a first lower electrode, a first upper electrode, a second insulating layer, a third insulating layer, a second lower electrode, a second upper electrode, a first alignment film, a second alignment film and a liquid crystal layer. A plurality of thin film transistors (TFT) are fabricated on the first substrate and a color filter is attached on the second substrate. The first insulating layer is formed on the first substrate to cover the TFTs and to provide insulation and planarization. The first lower electrode is formed on the first insulating layer. The first upper electrode is located on the second substrate. The second insulating layer and the third insulating layer are formed on the first lower electrode and the first upper electrode, respectively. The second lower electrode is located on the second insulating layer, and the second upper electrode is located on the third insulating layer. One of the first lower electrode and the second lower electrode is electrically connected to the TFTs. The first alignment film is formed on the second lower electrode, whereas the second alignment film is fabricated on second upper electrode. The liquid crystal layer is sandwiched between the first and the second alignment films.

BRIEF DESCRIPTION OF THE INVENTION

The foregoing aspects and many of the attendant advantages of this invention will become more readily appreciated and understood by referencing the following detailed description in conjunction with the accompanying drawings, wherein.

DETAILED DESCRIPTION OF THE INVENTION

The invention disclosed herein is directed to a transmissive type liquid crystal display (LCD) with at least two matrix modes converged within a liquid crystal display (LCD) panel, wherein one of the two matrix modes is an active matrix mode. When the transmissive type LCD is applied to a portable terminal device, the different demand from users can be satisfied with the switch between different matrix modes. For example, the passive matrix mode is activated to display low resolution images for lowing the electrical consumption. The active matrix mode is activated for displaying high resolution images and satisfying the demand of high resolution and fast switching rate. The embodiments of the present invention are now described in detail below.

Embodiment 1

Figures 1, 2:
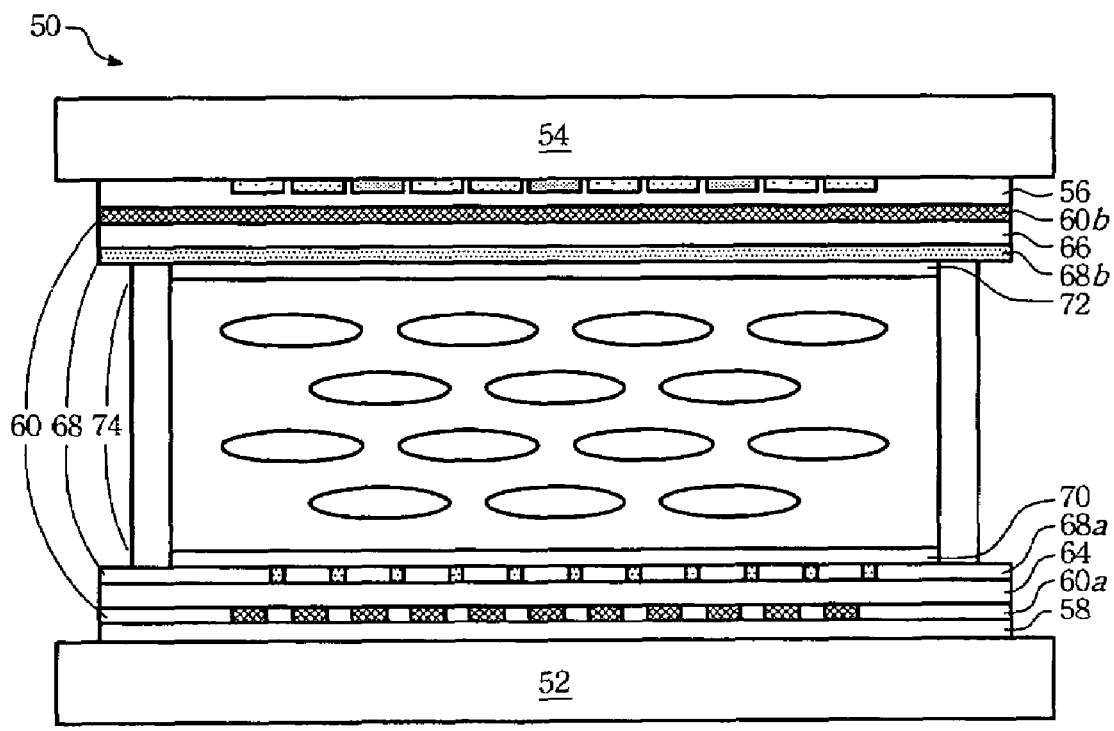
FIG. 1 shows a simple comparison between the AMLCD and PMLCD.
FIG. 2 is a cross-sectional view of a transmissive type liquid crystal display in accordance with the present invention.

Referring to FIG. 2, the transmissive type LCD 50 comprises a first substrate 52, an second substrate 54, a color filter 56, a first insulating layer 58, a set of first electrodes 60 with a passive matrix mode, a second insulating layer 64, a third insulating layer 66, a set of second electrodes 68 with a active matrix mode, a first alignment film 70, a second alignment film 72 and a liquid crystal layer 74. The first electrodes 60 include a first lower electrode 60a and a first upper electrode 60b, while the second electrodes 68 encompass a second lower electrode 68a and a second upper electrode 68b. A plurality of thin film transistors (TFTs; not shown herein) served as electronic switches and a color filter 56 are fabricated on the inner surfaces of the second substrate 54, and both first and second substrate can be made of glass, plastics or the like. The first insulating layer 58 is located on the first substrate 52 to cover the TFTs and to provide insulation and planarization.

As shown in FIG. 2, the first lower electrode 60a is located on the first insulating layer 58 and conductive patterned electrodes inlay within an insulating material. In this embodiment of the present invention, the conductive patterns of the first lower electrode 60a are made of indium tin oxide (ITO) with high transparence. The first upper electrode 60b is located on the forementioned color filter 56. Like the first lower electrode 60a, the first upper electrode 60b preferably comprises conductive ITO patterns and inlay within an insulating material. The second insulating layer 64 and the third insulating layer 66 are located on the first lower electrode 60a and the first upper electrode 60b, respectively.

Still referring back to FIG. 2, the second lower electrode 68a is located on the second insulating layer 64, and the second upper electrode 68b is located on the third insulating layer 66. In one preferred embodiment of the present invention, the second lower electrode 68a and second upper electrode 68b are conductive ITO patterns. The first alignment film 70 and the second alignment film 72 are located on the second lower electrode 68a and the second upper electrode 68b, respectively. The liquid crystal (LC) layer 74 is sandwiched between the first and the second alignment films, 70 and 72.

While one of the two sets of the electrodes described above are activated, to contribute to alignments of liquid crystal molecules within the LC layer, a voltage originally applied to the first lower electrode 60a is interfered by the second lower electrode 68a since the first lower electrode 60a and the second lower electrode 68a are both comprise conductive materials and the parasitic voltage is thus generated. For example, when applying 5 volts to the first lower electrode 60a, the second lower electrode 68a over the first lower electrode 60a is induced to have a parasitic voltage of about 1 volt. Thus, the displaying image triggered by the first lower electrode 60a will have undesirable interference due to the parasitic voltage.

In order to address the problem, dispositions of the first lower electrode 60a and the second lower electrode 68a are staggered in a preferred embodiment of the present invention.

Figure 3:
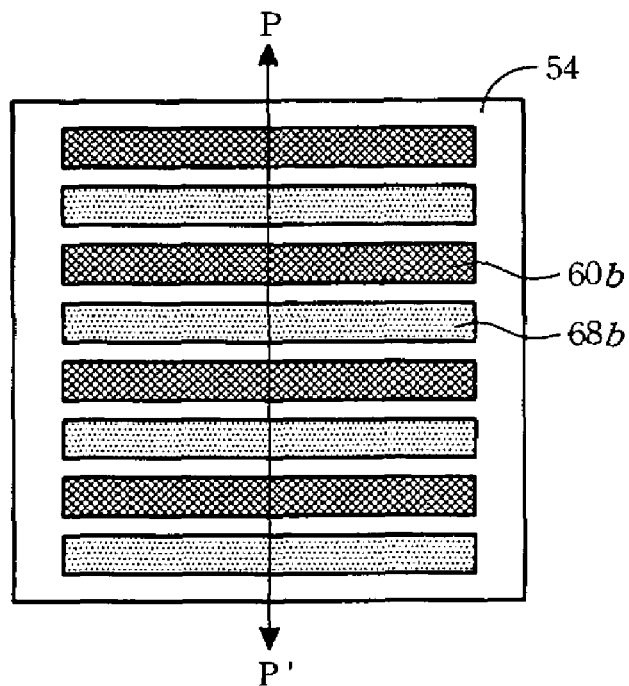
FIG. 3(A) is a top plan view, illustrating a configuration of a first upper electrode and a second upper electrode on a second substrate in accordance with the present invention.
FIG. 3(B) is a top plan view, illustrating a configuration of a first lower electrode and a second lower electrode on a first substrate in accordance with the present invention.
FIG. 3(C) is a cross-sectional view of the transmissive type liquid crystal displaye in accordance with the present invention.
Figure 3:
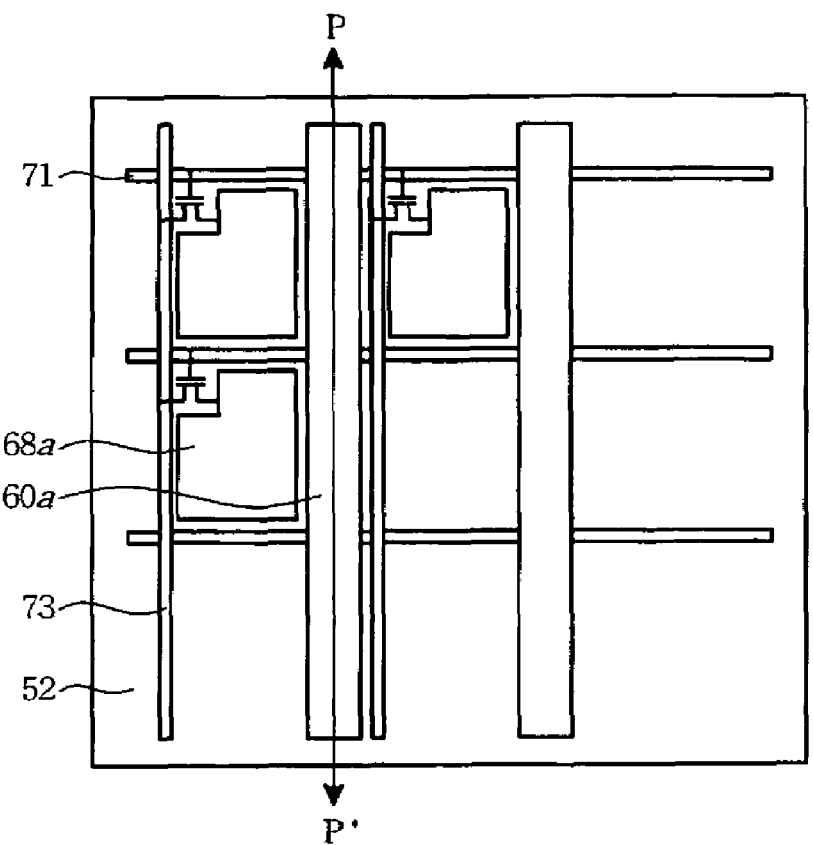
Figure 3:
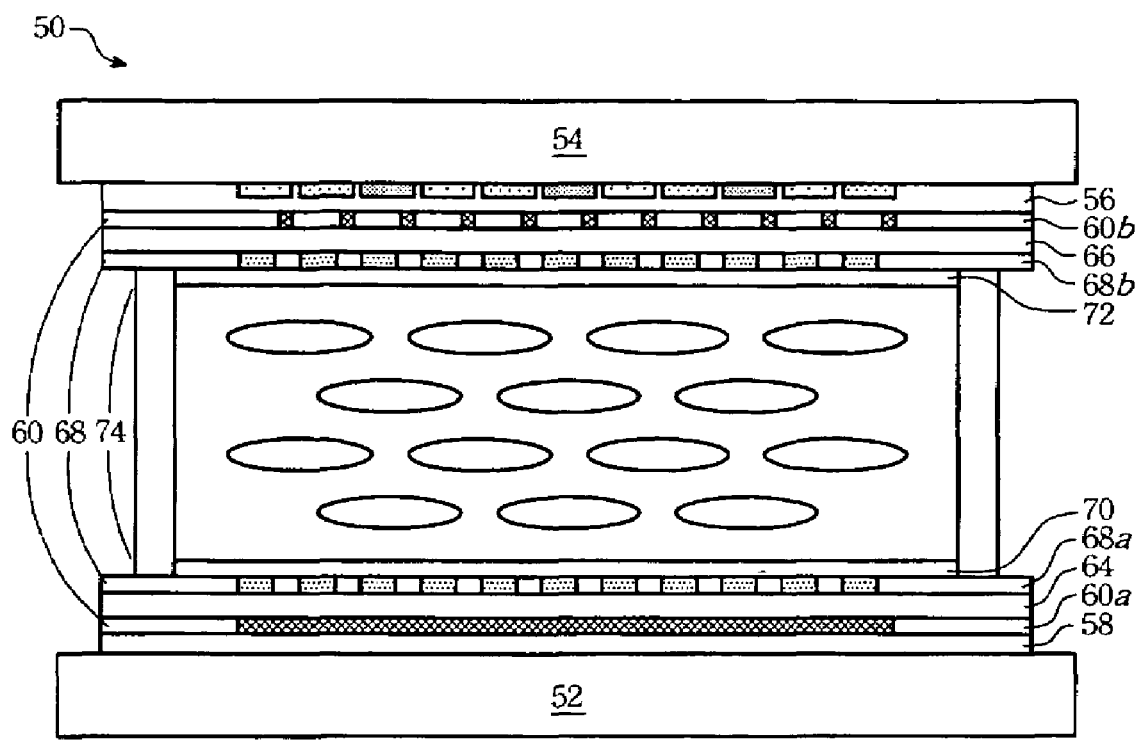

FIG. 3(A) is a top plan view illustrating a configuration of the first upper electrode 60b and the second upper electrode 68b on the second substrate 54.

FIG. 3(C) shows a top plan view illustrating a configuration of the first lower electrode 60a, the second lower electrode 68a, a plurality of scan lines 71 and data lines 73 on the first substrate 52. FIG. 3(C) is a cross-sectional view of an LCD provided by the present invention when assembling layers shown in FIG. 3(A) with layers shown in FIG. 3(B) (section P$\leftrightarrow$P').

As shown in FIG. 3(B), the first lower electrode 60a and the second lower electrode 68a located over the first substrate 52 are staggered to prevent the undesired electric interference occurred between two conductive layers.

Referring to FIG. 3(A), the first upper electrode 60b is a column electrode which comprises a plurality of patterns aligned in column direction. The first lower electrode 60a shown in FIG. 3(B) is a row electrode includes plural patterns aligned in row direction. This configuration forms a matrix mode. When applying two respective voltages to the column electrode and the row electrode, aligning state of the liquid crystal molecules within the LC layer are changed by a potential difference produced at an intersection between the row and column electrodes (i.e. the intersection is so-called pixel). As shown in the figure, the second lower electrode 68a is electrically connected to drains of the TFTs. Sources and gates of the TFTs are in contact with the data lines 73 and the scan lines 71, respectively. While the TFTs are turned on, alignments of the liquid crystal molecules are altered by a potential difference in each pixel.

In another embodiment, a 1 volt of negative voltage is supplied to the second lower electrode 68a at the time of applying 5 volts of positive voltage to the first lower electrode 60a for neutralizing 1 volt of positive parasitic voltage and preventing the generation of undesired electric interference. By this way, the resolution of the image displayed on the LCD is improved.

The object of the present invention is to integrate at least two matrix modes within an LCD panel. However, modifications can be made as illustrated below.

Embodiment 2

The difference between Embodiment 2 and Embodiment 1 is that only one of the first upper electrode 60b and second upper electrode 68b is located on the second substrate 54 to serve as a common electrode for both of the first lower electrode 60a and second lower electrode 68a. When applying two respective voltages to the first lower electrode 60a and the common electrode, the first lower electrode 60a serves as the row electrode and the common electrode serves as the column electrode. When the second lower electrode 68a is supplied with a voltage and the common electrode is electrically connected to a reference voltage, a potential difference between the common electrode and the second lower electrode 68a triggers alignments of liquid crystal molecules.

Embodiment 3

Figure 4:
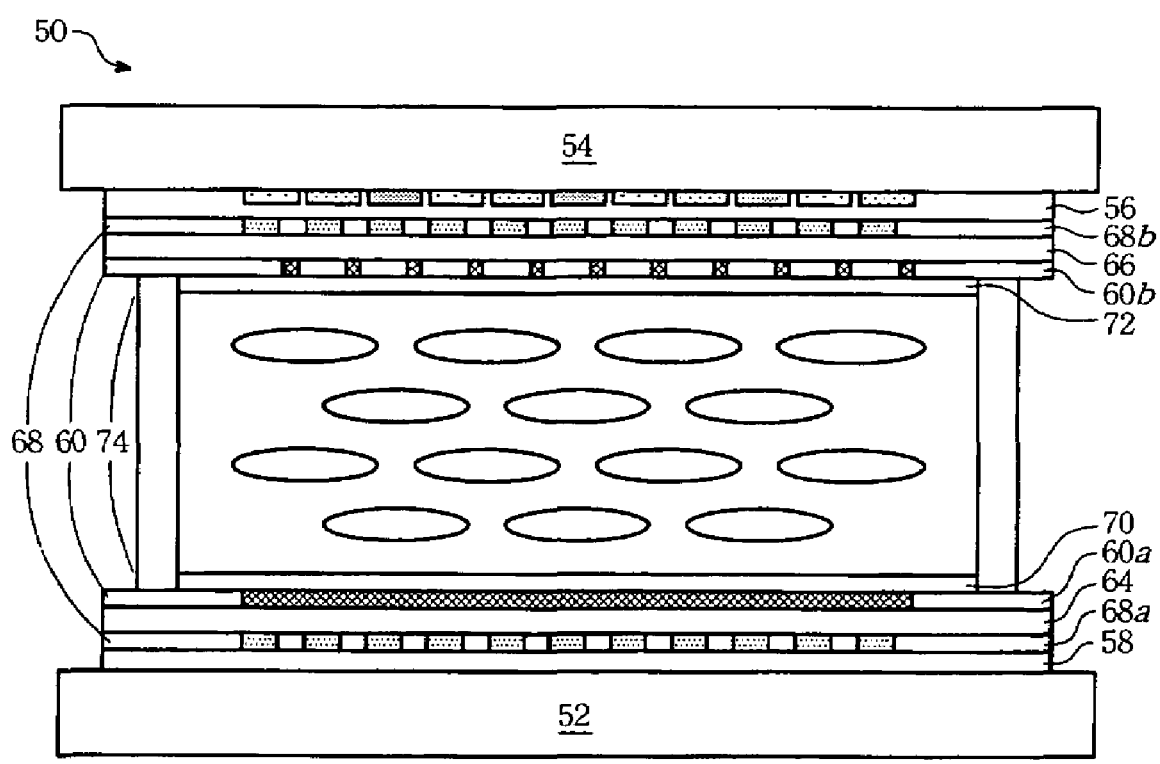
FIG. 4 is a cross-sectional view of the transmissive type liquid crystal display in accordance with the present invention.

Referring to FIG. 4, the differences between Embodiment 3 and Embodiment 1 are that locations of the first lower electrode 60a and the second lower electrode 68a are interchanged. In addition, the locations of the first upper electrode 60b and the second upper electrode 68b are interchanged.

Since two sets of electrodes of the present invention are integrated within a LCD panel, the size and the weight of the portable terminal device can be reduced. When the portable terminal device is standby, the passive matrix mode is activated optionally to save electrical consumption; while the portable terminal device is in use, the active matrix mode is activated optionally to obtain a higher resolution. In addition, two sets of electrodes of the present invention are converged within one panel, so that the cost and complexity of the manufacturability can be reduced.

Various other modifications will be apparent to and can be readily mad by those skilled in the art without departing from the scope and spirit of this invention. Accordingly, it is not intended that the scope of the claims appended hereto be limited to the description as set forth herein, but rather that the claims be broadly construed.

What is claimed is:

1. A transmissive type liquid crystal display with at least two matrix modes integrated within a panel, comprising:
   a first substrate;
   a second substrate opposite to the first substrate, wherein opposing inner surfaces of the first substrate and the second substrate have a plurality of thin film transistors and a color filter fabricated thereon, respectively;
   a first insulating layer located on the first substrate to cover the thin film transistors;
   a first set of electrodes, comprising
      a first lower electrode located on the first insulating layer; and
      a first upper electrode located on the color filter;
   a second insulating layer formed on the first lower electrode;
   a third insulating layer formed on the first upper electrode; and a second lower electrode formed on the second insulating layer,
   wherein only one of the first lower electrode and the second lower electrode is operatively coupled to one of the plurality of thin film transistors to correspond to an active matrix mode, and the other one of the first lower electrode and the second lower electrode corresponds to a passive matrix mode.

2. The transmissive type liquid crystal display of claim 1, wherein the first set of electrodes are operated at an active matrix mode and the second lower electrodes are operated at a passive matrix mode.

3. The transmissive type liquid crystal display of claim 1, wherein the first set of electrodes are operated at a passive matrix mode and the second lower electrodes are operated at an active matrix mode.

4. The transmissive type liquid crystal display of claim 1, wherein the first upper electrode is a common electrode for the first lower electrode and the second lower electrode.

5. The transmissive type liquid crystal display of claim 1, further comprising a second upper electrode located on the third insulating layer.

6. The transmissive type liquid crystal display of claim 1, wherein the first lower electrode and the second lower electrode are staggered.

7. The transmissive type liquid crystal display of claim 1, wherein the second lower electrode is supplied with a voltage to neutralize a parasitic voltage induced at the time of activating the first lower electrode.

8. A transmissive type liquid crystal display with at least two matrix modes integrated within a panel, comprising:
   a first substrate;
   a second substrate opposite to the first substrate, wherein opposing inner surfaces of the first substrate and the second substrate have a plurality of thin film transistors and a color filter fabricated thereon respectively;
   a first insulating layer formed on the first substrate to cover the thin film transistors;
   a first set of electrodes, comprising
      a first lower electrode located on the first insulating layer;
      a first upper electrode located on the color filter;
   a second insulating layer located on the first lower electrode;
   a third insulating layer formed on the first upper electrode; and
   a second set of electrodes, comprising
      a second lower electrode located on the second insulating layer; and
      a second upper electrode located on the third insulating layer,
   wherein only one of the first set of electrodes and the second set of electrodes is activated optionally to create images.

9. The transmissive type liquid crystal display of claim 8, wherein the first set of electrodes are operated at an active matrix mode and the second set of electrodes are operated at a passive matrix mode.

10. The transmissive type liquid crystal display of claim 8, wherein the first set of electrodes are operated at a passive matrix mode and the second set of electrodes are operated at an active matrix mode.

11. The transmissive type liquid crystal display of claim 8, wherein the first lower electrode and the second lower electrode are staggered.

12. The transmissive type liquid crystal display of claim 8, wherein the second lower electrode is supplied with a voltage to neutralize a parasitic voltage induced at the time of activating the first lower electrode.

13. A liquid crystal display panel, comprising:
   a liquid crystal layer;
   a first set of electrode layers with an active matrix mode; and
   a second set of electrode layers with a passive matrix mode,
      wherein only one of the first set of the electrode layers and the second set of the electrode layers are activated to trigger alignments of the liquid crystal molecules within the liquid crystal display panel, wherein the first set of electrode layers comprises a first pair of electrodes operating on the liquid crystal layer, wherein the second set of electrode layers comprises a second pair of electrodes operating on the same liquid crystal layer, and wherein the first pair of the electrodes or the second pair of electrodes are selectively operated to create images with the same liquid crystal layer.

14. The liquid crystal display panel as in claim 13, wherein the first pair of electrodes comprises a first upper electrode and a first lower electrodes, and the second pair of electrodes comprises a second upper electrode and a second lower electrode, wherein at least the first and second upper electrodes or the first and second lower electrodes are stacked in layers on a same side of the liquid crystal layer, without any liquid crystal layer between the stacked layers.

15. The liquid crystal display panel as in claim 13, wherein the first pair of electrodes comprises a first upper electrode and a first lower electrodes, and the second pair of electrodes comprises a second upper electrode and a second lower electrode, wherein at least the first and second upper electrodes or the first and second lower electrodes are staggered on a saint side of the liquid crystal layer.

16. A liquid crystal display, comprising a liquid crystal display panel as in claim 13.

17. The liquid crystal display as in claim 16, wherein the first pair of electrodes comprises a first upper electrode and a first lower electrodes, and the second pair of electrodes comprises a second upper electrode and a second lower electrode, wherein at least the first and second upper electrodes or the first and second lower electrodes are stacked in layers on a same side of the liquid crystal layer, without any liquid crystal layer between the stacked layers.

18. The liquid crystal display as in claim 16, wherein the first pair of electrodes comprises a first upper electrode and a first lower electrodes, and the second pair of electrodes comprises a second upper electrode and a second lower electrode, wherein at least the first and second upper electrodes or the first and second lower electrodes are staggered on a same side of the liquid crystal layer.

* * * * *